Patented Dec. 18, 1928.

1,695,638

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

COATING COMPOSITION AND PROCESS OF MAKING SAME.

No Drawing.    Application filed August 29, 1921. Serial No. 496,594.

This invention relates to a composition adapted for use as a coating and impregnation agent, by means of which wood, metal or other surfaces or fabrics and fibrous material may be respectively coated or impregnated, or both, affording a protective effect against moisture and other destructive agencies.

The invention involves the use essentially of chlorinated rubber. By chlorinated rubber I mean primarily raw rubber which has been treated with chlorine or any suitable chlorinating agent to add a substantial amount of chlorine. Raw rubber is an easily oxidized substance which when dissolved in a suitable solvent does not dry readily but remains sticky for an indefinite period. When raw rubber is put into drying oils the drying of the latter apparently is retarded. Raw rubber therefore has a somewhat limited field in the preparation of coating compositions. Rubber which has been vulcanized by treatment with sulphur is not readily soluble and hence rubber cured in this manner cannot be extensively used. With a very slight degree of vulcanization, imperfect solutions possibly may be obtained but the rubber is not well enough cured to be serviceable in other respects.

Moreover raw rubber does not dissolve in solvents to form other than very dilute solutions. Even one per cent of raw rubber of good quality dissolved in a solvent such as carbon tetrachloride makes quite a viscous solution. As a coating composition, such as ordinary varnish should contain say 20% to 40% of total solids, in order that each coat of varnish as applied will furnish a substantial addition or increment of solid material to the coating, raw rubber cannot be used for this as well as other reasons stated.

A properly cured rubber which is readily soluble in organic solvents is found in chlorinated rubber. Other halogens, such as bromine or mixtures of chlorine, bromine or even iodine and fluorine are not beyond the purview of the present invention in certain of its phases.

Raw rubber will unite with hydrochloric, hydrobromic and hydrofluoric acid to form an addition product. The amount of halogenation obtainable in this way is limited by the degree of unsaturation of the rubber. Usually not much over 30% of chlorine may be thus introduced. Treatment with chlorine gas enables substituted products to be prepared containing much larger amounts of combined chlorine.

A good grade of rubber which has been well chlorinated, the chlorinated product containing say 40 to 50% or higher of chlorine, is well cured, free from stickiness and in fact has lost the characteristics of raw rubber, except that the chlorinated rubber retains a certain measure of toughness which renders it most useful in compositions where brittleness is objectionable.

The chlorinated rubber dissolves readily in many organic solvents, e. g. carbon tetrachloride, trichlorethylene, acetylene tetrachloride and other chlorhydrocarbons. It dissolves in benzol, toluol, solvent naphtha and chlorbenzol, chlortoluol, carbon bisulphide etc. It is not soluble in alcohol, acetone and similar solvents to any great extent, other than that resins present in the original rubber may be extracted from the chlorinated rubber by such solvents. Certain grades of chlorinated rubbers are somewhat soluble in ethyl acetate and similar esters. Chlorinated rubber is not soluble in gasoline, varnish maker's naphtha, kerosene etc. but these vehicles may be added to some extent to solutions of chlorinated rubber in other solvents.

A chlorinated rubber which contains a high percentage of chlorine (chlorine of addition and substitution) is quite resistant to ignition and combustible materials coated or treated with such chlorinated rubber do not ignite and burn readily, or in some cases do not not ignite at all. Surfaces can be rendered non-inflammable to a high degree. Chlorinated rubber containing at least 50% of chlorine and preferably 66⅔% or 70% is desirable for the purpose. In other words rubber which has been chlorinated to a gain in weight of at least 100% and preferably 200% or 225% is best for such non-inflammable purposes. Paper coated and impregnated with this chlorinated rubber is waterproof and not easily ignited. By using carbon tetrachloride or other non-inflammable solvent a safe type of varnish which may be stored or carried on shipboard etc. without danger is produced.

For ordinary varnishing purposes toluol and solvent naphtha are well adapted. Benzol evaporates so rapidly that the composition, especially when heavy bodied cannot be brushed out well without showing brush marks. The chlorinated rubber is not as soluble in solvent naphtha and a mixture of toluol and solvent naphtha is best. Equal parts may be used or preferably a larger proportion of toluol.

Toluol and solvent naphtha, as well as mixtures thereof, and mixtures consisting largely of one or both of these, especially when not containing any large proportions of light gasoline or other extremely volatile hydrocarbons or of other readily inflammable solvents, are not nearly so inflammable as are light gasoline, carbon bisulfid, ether, wood alcohol, etc. Accordingly such solvents can be included in the expression hereinafter used, " a volatile solvent of a not readily inflammable character."

A solution of chlorinated rubber only, when dried on a surface forms a tough coating which is not as hard as is desired for some purposes and in the present invention in its preferred form, drying oils are added in greater or less amount, preferably in proportion less than that of the chlorinated rubber. In other words chlorinated rubber preferably forms the major or predominating constituent. During the drying, the volatile solvent evaporates.

Chinese wood oil or tung oil is best for the purpose. This oil is a peculiar one and is not readily worked into the form of a varnish without the use of rosin. Wood oil will "frost" and give trouble in other ways if incompatible substances are present. In many respects it differs greatly from linseed oil.

With chlorinated rubber the tung oil may be added at least in moderate amount and the coating dries quickly and is hard. Coatings thus may be produced which are hard enought to sandpaper etc. Only a small proportion of tung oil is needed. For exemple 1 part of the oil to 10 or 15 parts of chlorinated rubber gives a useful coating compound. This does not "frost" on drying but affords a clear light-colored tough coating.

Chlorinated rubber is quite resistant to alkalies and acids and the use of a small amount of tung oil is desirable when the coating is to be exposed to fumes of ammonia, hydrochloric acid etc. The composition may be used for ordinary varnishing purposes, for coating concrete, an acid and alkali resistant protective coating, hospital paint, varnishes or paints used. When mixed with basic pigments the composition does not "liver." Enamels and similar products may be made using zinc oxide, white lead and other pigments which easily "liver" in ordinary varnish containing acid resins.

Waxes such as paraffin, ceresin or beeswax may be added in small proportion to produce flatting effects. Wax greatly retards the drying of ordinary varnish and so-called wax finishes never dry hard. Chlorinated rubber compositions of the character described dry very quickly in some cases becoming dry to the touch and non-tacky in 10 or 20 minutes, gradually hardening in an hour or a few hours to a tough hard surface. A board coated in this manner and sawed in two does not show fracture or cracks in the varnish along the cut; indicating the tough qualities of the coating.

The proportion of tung oil may be increased above that stated but preferably should not be increased above the point at which the tung oil ceases to form a solid solution with the oil. Satisfactory films are not readily obtainable above this point. The maximum proportion of oil will vary with different chlorinated rubbers and other conditions and may be readily determined by mixing a test solution of chlorinated rubber and tung oil in several proportions, forming films and noting the homogeneity of these.

Linseed oil also may be used in some cases but it dries more slowly and generally requires the addition of a drier, which is not necessary with tung oil. Boiled oils, blown oils such as blown rape oil also may be introduced. Resins, resin esters and varnish gums of various sorts may be added if desired but often such additions are detrimental for specified purposes owing to the acid character of many resins.

The use of linseed oil in varnishes of the class herein described, is not claimed specifically in the present application, but is claimed in my copending case Serial No. 701,024, filed March 22, 1924.

Chlorinated rubber solution containing a small amount of tung oil, the solvent being a readily volatile one such as tolutol, is notable for rapidity of drying and hardness and toughness of residual film. This is quite in contrast with varnishes of the usual type. With these, " quick-drying " is a term suggestive of brittleness and lack of durability Chlorinated rubber is liable to become somewhat acid on standing and it is best to have present some ant-acid such as aniline, toluidine, urea, diphenylamine, phenylene diamine, sodium acetate, ammonium formate etc.

In preparing chlorinated rubber, the hydrochloric acid produced by treatment with chlorine in an advanced stage of the process may be used to treat raw rubber and form the dichloride which may be subsequently contacted with chlorine to secure a perchlorinated rubber such as is preferred herein.

Mixtures of chlorinated rubbers of different degrees of chlorination may be used for example 2 parts of one kind containing 40% chlorine to 1 part of a kind containing 70% chlorine. The use of at least two grades of chlorinated rubber of differing chlorine content affords a better mix with some oils and is within the purview of the present invention.

While I have recommended raw rubber for chlorination purposes, it should be understood that devulcanized, reclaimed and waste rubber or scrap may be used in some cases to make chlorinated products to be mixed with tung oil or other drying oil where a cheap low grade product will serve in place of a high grade one. Such low-grade products do not however fall within the preferred type of the present invention. Rubber which has not been chemically changed by such a drastic process as sulphur-vulcanization is greatly preferred to carry out the object of this invention.

I preferably prepare the solutions of chlorinated rubber of at least 20 or 25% strength, thereby affording enough chlorinated rubber in solution to yield a good coating.

Suitable formulæ for coating compositions are chlorinated rubber (70% chlorine content) 4 parts by weight, Chinese wood oil 1 part, toluol 10 parts. When zinc sulphide or lithopone is added to this in an amount by weight of 30% or more of the chlorinated rubber solution, the paint or enamel thus produced dries to a tough nearly flat surface.

Processed rape seed oil when added to chlorinated rubber solutions in moderate amounts does not precipitate the chlorinated rubber. 1 part by weight of the processed rape seed oil, 5 parts of chlorinated rubber and 10 parts of toluol may be used as a varnish. It is very quick drying and the coating does not spot with hot or cold water.

Another composition is made by dissolving chlorinated rubber 4 parts by weight and tung oil 1 part in toluol 8 parts. Softening agents such as triphenyl or tricresyl-phosphate, orthodichlorbenzol, benzyl alcohol, camphor, monochlornaphthalene etc. may be added.

A peculiarity about solutions of chlorinated rubber incorporated with a volatile solvent alone, without other additions is that of segregation. For example a solution of chlorinated rubber in benzol alone, when poured out on glass, dried with separation of white particles giving the film a very milky appearance. A ripply surface also frequently appears. Drying oils such as linseed, tung and rape oil added in moderate amounts prevent such segregation, the film drying clear and smooth. This result is especially noticeable with chlorinated rubber of high chlorine content (such as 66⅔ to 70% or more).

This case is in part a continuation of my copending case 442,245 filed February 3, 1921.

The use of linseed oil specifically is not claimed in the present case, but in a copending application Ser. No. 701,024, filed Mar. 22, 1924.

What I claim is:—

1. A coating and impregnating composition which comprises a drying oil and chlorinated rubber containing at least 66% combined chlorine, in a volatile solvent, such composition being a quick-drying product.

2. A coating and impregnating composition which comprises tung oil, and chlorinated rubber containing at least 66% combined chlorine, in a volatile solvent, such product being quick-drying.

3. A quick-drying coating and impregnating composition which comprises chlorinated rubber containing at least 66% combined chlorine, together with a smaller amount of tung oil, and a volatile solvent.

4. A quick-drying coating and impregnating composition which comprises tung oil, and chlorinated rubber containing at least 66% combined chlorine, in a solvent including toluol.

5. A composition comprising a drying oil, a volatile solvent of a not readily inflammable character and chlorinated rubber containing at least 66% combined chlorine.

6. A composition comprising a drying oil, a volatile solvent of a not readily inflammable character and chlorinated rubber.

7. A composition comprising a drying oil including Chinese wood oil, a volatile solvent and chlorinated rubber.

8. A composition comprising a solution of chlorinated rubber and tung oil, less oil being present than chlorinated rubber.

9. A composition comprising a solution of chlorinated rubber and drying oil, less oil being present than chlorinated rubber.

10. A composition comprising a solution of chlorinated rubber and tung oil.

11. A composition comprising a solution of chlorinated rubber and a drying oil.

12. A varnish comprising chlorinated rubber as a major constituent of the total solids, incorporated with a drying oil and a volatile thinner.

13. A varnish comprising chlorinated rubber as a major constituent of the total solids, incorporated with a glyceride and a volatile thinner.

14. A varnish comprising chlorinated rubber as a major constituent of the total solids, incorporated with tung oil and a volatile thinner.

15. A varnish comprising chlorinated rubber as an essential constituent of the total solids, incorporated with tung oil and a volatile thinner.

16. A varnish comprising chlorinated rubber, tung oil and a thinner comprising toluol.

17. A varnish comprising chlorinated rubber, tung oil and a thinner comprising solvent naphtha.

18. A chlorinated rubber solution containing chlorinated rubber and a resin and a drying oil.

19. A chlorinated rubber solution containing a drying oil, a resin and an organic ant-acid material.

20. A permanently neutral chlorinated rubber solution, containing a drying oil and a resin.

21. A chlorinated rubber solution containing ant-acid material and chlorinated raw rubber containing more than 50% combined chlorine, such solution also containing a drying oil.

22. A chlorinated rubber solution containing a drying oil and at least two grades of chlorinated rubber of differing chlorine content.

23. A composition comprising an unsaturated glyceride and a sufficient amount of chlorinated rubber therein to form a liquid coating composition.

CARLETON ELLIS.